US012556398B2

(12) United States Patent
Cohen et al.

(10) Patent No.: US 12,556,398 B2
(45) Date of Patent: Feb. 17, 2026

(54) METHOD FOR SIMULTANEOUS EXECUTION OF TRANSACTIONS ON A BLOCKCHAIN VIA A COIN SET MODEL

(71) Applicant: Chia Network Inc., San Francisco, CA (US)

(72) Inventors: Bram Cohen, San Francisco, CA (US); Richard Kiss, San Francisco, CA (US); Matt Howard, San Francisco, CA (US)

(73) Assignee: Chia Network Inc., San Francisco, CA (US)

( * ) Notice: Subject to any disclaimer, the term of this patent is extended or adjusted under 35 U.S.C. 154(b) by 360 days.

(21) Appl. No.: 18/107,430

(22) Filed: Feb. 8, 2023

(65) Prior Publication Data

US 2023/0269087 A1    Aug. 24, 2023

Related U.S. Application Data

(60) Provisional application No. 63/307,883, filed on Feb. 8, 2022.

(51) Int. Cl.
| | | |
|---|---|---|
| *H04L 9/32* | (2006.01) | |
| *H04L 9/00* | (2022.01) | |
| *H04L 9/14* | (2006.01) | |

(52) U.S. Cl.
CPC ............ *H04L 9/3236* (2013.01); *H04L 9/14* (2013.01); *H04L 9/50* (2022.05)

(58) Field of Classification Search
CPC ............ H04L 9/3236; H04L 9/50; H04L 9/14
See application file for complete search history.

(56) References Cited

U.S. PATENT DOCUMENTS

| | | |
|---|---|---|
| 10,951,409 B2 | 3/2021 | Konda et al. |
| 11,128,463 B1 | 9/2021 | Thompson et al. |
| 2016/0342976 A1* | 11/2016 | Davis ............... G06Q 20/10 |
| 2017/0091726 A1 | 3/2017 | Morgan et al. |
| 2018/0089678 A1 | 3/2018 | Metnick et al. |
| 2018/0331832 A1 | 11/2018 | Pulsifer |

(Continued)

OTHER PUBLICATIONS

ISR received in PCT/US23/12640 dated May 17, 2023.

(Continued)

*Primary Examiner* — Carl G Colin
*Assistant Examiner* — Zhe Liu
(74) *Attorney, Agent, or Firm* — Run8 Patent Group, LLC; Peter Miller; Brian T. Chew

(57) ABSTRACT

A method includes: accessing a transaction to execute a target blockchain object, the transaction defining a target object identifier, a target puzzle, and a solution representing a set of arguments associated with the target puzzle; generating a target puzzle hash based on the target puzzle; identifying a first blockchain object—in a set of blockchain objects—defining a first object identifier, and a first puzzle hash representing a first puzzle; generating an output in response to executing the target puzzle based on the solution; and, in response to detecting a match between the target object identifier and the first object identifier, in response to detecting a match between the target puzzle hash and the first puzzle hash, and in response to evaluating the output as true, generating a second blockchain object in the set of blockchain objects, and removing the first blockchain object from the set of blockchain objects.

20 Claims, 4 Drawing Sheets

(56) References Cited

U.S. PATENT DOCUMENTS

| | | |
|---|---|---|
| 2019/0130701 A1 | 5/2019 | Simons |
| 2020/0127833 A1 | 4/2020 | Konda et al. |
| 2020/0175600 A1 | 6/2020 | Mitch et al. |
| 2020/0252213 A1 | 8/2020 | Vijayan et al. |
| 2020/0266989 A1* | 8/2020 | Krcmaricic-Barackov ................ H04L 9/30 |
| 2021/0067321 A1 | 3/2021 | Lu |
| 2021/0091960 A1* | 3/2021 | Werner ................ H04L 9/0897 |
| 2021/0192498 A1 | 6/2021 | Chan et al. |
| 2021/0256013 A1 | 8/2021 | Yang |
| 2021/0264531 A1 | 8/2021 | Leise et al. |
| 2021/0281921 A1* | 9/2021 | Bhuyan ................ H04L 9/3239 |
| 2021/0406250 A1* | 12/2021 | Novo Diaz ......... G06F 16/2379 |
| 2022/0116223 A1 | 4/2022 | Zamani et al. |
| 2022/0129893 A1 | 4/2022 | Wright et al. |
| 2022/0207023 A1* | 6/2022 | White ................ G06F 16/2365 |
| 2022/0216997 A1 | 7/2022 | Davies et al. |
| 2022/0278859 A1 | 9/2022 | Mackay et al. |
| 2022/0321360 A1* | 10/2022 | Wahab ................ H04L 9/3252 |
| 2023/0188366 A1* | 6/2023 | Steinmetz ............ H04L 9/3247 713/176 |
| 2023/0230076 A1* | 7/2023 | Davies ................ G06Q 20/407 705/75 |
| 2023/0244394 A1* | 8/2023 | Bert ...................... G06F 3/0634 711/154 |
| 2023/0334036 A1* | 10/2023 | Covaci ................ G06F 16/289 |

OTHER PUBLICATIONS

Benarroch et al., Zero-Knowledge Proofs for Set Membership: Efficient, Succinct, Modular, QEDIT (Israel), MDEA Software Institute (Madrid, Spain), Ethereum Foundation, cLabs.

Fiore, D., Zero-Knowledge Proofs for Membership, The Art Of Zero Knowledge, ZKPROOF, Feb. 27, 2020.

Non-Final Office Action for U.S. Appl. No. 17/966,214 dated Jan. 25, 2023.

Onalo et al., Virtual Private Blockchains: Security Overlays for Permissioned Blockchains, Scholl of Computer Science and Mathematics (UK), Cyber 2020, Nice (FR).

* cited by examiner

METHOD FOR SIMULTANEOUS EXECUTION OF TRANSACTIONS ON A BLOCKCHAIN VIA A COIN SET MODEL

CROSS-REFERENCE TO RELATED APPLICATIONS

This Application claims the benefit of U.S. Provisional Application No. 63/307,883, filed on 8 Feb. 2022, which is incorporated in its entirety by this reference.

This Application is related to U.S. patent application Ser. No. 17/966,214, filed on 14 Oct. 2022, which is incorporated in its entirety by this reference.

TECHNICAL FIELD

This invention relates generally to the field of blockchain protocols and more specifically to a new and useful method for simultaneous execution of transactions on a blockchain via a coin set model within the field of blockchain protocols.

DESCRIPTION OF THE EMBODIMENTS

Figure 1:
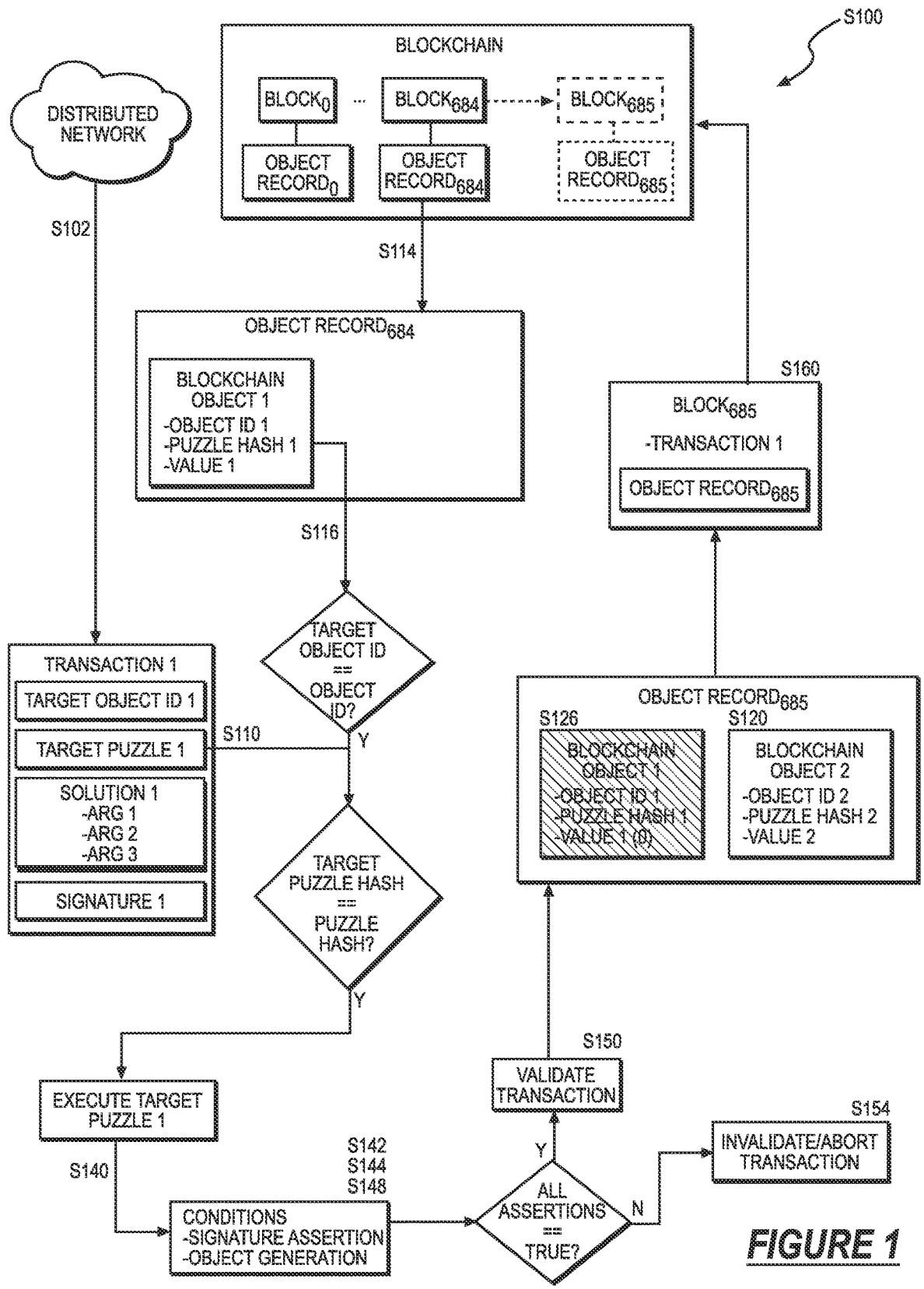
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-4, a method S100 for extending a blockchain in a distributed network includes, by a node in the distributed network: accessing a first transaction to execute a first target blockchain object in Step S102, the first transaction defining a first target object identifier (hereinafter "ID") and a first target puzzle defining a first set of instructions; generating a first target puzzle hash based on the first target puzzle in Step S110; and identifying a first blockchain object in a set of blockchain objects in Step S116, the first blockchain object defining a first object ID and a first puzzle hash representing a first puzzle.

The method S100 further includes, in response to detecting a match between the first target object ID and the first object ID, and in response to detecting a match between the first target puzzle hash and the first puzzle hash: generating a second blockchain object in the set of blockchain objects in Step S120, the second blockchain object defining a second object ID based on the first object ID, and a second puzzle hash representing a second puzzle based on the first puzzle; and removing the first blockchain object from the set of blockchain objects in Step S126.

1.1 Variation: Simultaneous Transaction Execution

As shown in FIGS. 1-4, one variation of the method S100 includes, by a node in the distributed network, during a first time period: accessing a transaction set in Step S106, the transaction set including a first transaction to execute a first target blockchain object, the first transaction defining a first target object ID and a first target puzzle defining a first set of instructions, and a second transaction to execute a second target blockchain object, the second transaction defining a second target object ID and a second target puzzle defining a second set of instructions; generating a first target puzzle hash based on the first target puzzle in Step S110; and generating a second target puzzle hash based on the second target puzzle in Step S112.

This variation of the method S100 further includes: identifying a first blockchain object in a set of blockchain objects in Step S116, the first blockchain object defining a first object ID and a first puzzle hash representing a first puzzle; and identifying a second blockchain object in the set of blockchain objects in Step S118, the second blockchain object defining a second object ID and a second puzzle hash representing a second puzzle.

This variation of the method S100 further includes, in response to detecting a match between the first target object ID and the first object ID, and in response to detecting a match between the first target puzzle hash and the first puzzle hash, generating an announcement specifying the first object ID in Step S146.

This variation of the method S100 further includes, in response to detecting a match between the second target object ID and the second object ID, in response to detecting a match between the second target puzzle hash and the second puzzle hash, and in response to detecting the announcement specifying the first object ID: generating a third blockchain object, in the set of blockchain objects, based on the second blockchain object in Step S122; and removing the second blockchain object from the set of blockchain objects in Step S128.

1.2 Variation: Target Puzzle Execution

As shown in FIGS. 1-4, one variation of the method S100 includes: accessing a transaction to execute a target blockchain object in Step S102, the transaction defining a target object ID, a target puzzle, and a solution representing a set of arguments associated with the target puzzle; generating a target puzzle hash based on the target puzzle in Step S110; identifying a first blockchain object in a set of blockchain objects in Step S116, the first blockchain object defining a first object ID, and a first puzzle hash representing a first puzzle; and generating an output in response to executing the target puzzle based on the solution in Step S140.

This variation of the method S100 further includes, in response to detecting a match between the target object ID and the first object ID, in response to detecting a match between the target puzzle hash and the first puzzle hash, and in response to evaluating the output as true: generating a second blockchain object in the set of blockchain objects in Step S120; and removing the first blockchain object from the set of blockchain objects in Step S126.

2. Applications

Generally, Steps of the method S100 can be executed by a population of nodes (e.g., computing devices) in a distributed computer network: to access a transaction to execute a target blockchain object; to match the target blockchain object to a particular blockchain object in a set of extant blockchain objects; and to modify a record of blockchain objects (or "object record")—specifying the set of extant blockchain objects responsive to valid execution of the target blockchain object—for inclusion in subsequent blocks of a blockchain (e.g., a proof-of-space-based blockchain). Additionally, Steps of the method S100 can be executed by nodes in the population to generate a new block—including the transaction and/or the object record—to extend the blockchain.

Accordingly, Steps of the method S100 can be executed by these nodes to: execute (or "spend") a first blockchain object defining a unique identifier (or "object ID"), executable program code representing specific functionality of the blockchain object, and/or a value representing an amount of an asset secured by the blockchain object; generate second blockchain object based on the first blockchain object; and update the object record to include the second blockchain object and exclude the first blockchain object, thereby generating a scalable, auditable, and immutable record across blocks of the blockchain.

2.1 Conditions and Evaluation

Additionally, Steps of the method S100 can be executed by these nodes to: generate output conditions responsive to execution of target blockchain objects; and simultaneously evaluate these conditions to validate (or invalidate) transactions. More specifically, Steps of the method S100 can be executed by nodes to: generate an assertion condition—in response to executing a first target blockchain object based on a first transaction—specifying a requirement, such as presence of an announcement condition specifying a particular object ID, for the first transaction to be valid; and evaluate the assertion condition as TRUE (or FALSE) based on presence (or absence) of the announcement condition and the particular object ID. For example, Steps of the method S100 can be executed by nodes to: generate the announcement condition—in response to executing a second target blockchain object based on a second transaction—specifying the particular object ID; evaluate the assertion condition as TRUE in response to detecting the announcement condition; and validate the first and the second transactions in a single block of the blockchain.

Accordingly, Steps of the method S100 can be executed by nodes to fuse multiple transactions into a single transaction set that implements interoperability between blocks, blockchain objects, and/or other transactions, thereby enabling applications such as cryptocurrency exchange between user addresses, non-fungible token (or "NFT") creation and exchange, smart contract creation and execution, and private database storage on a public blockchain (such as described in U.S. patent application Ser. No. 17/966,214).

Furthermore, Steps of the method S100 can be executed by nodes to: fuse multiple transactions into a single transaction set—including an aggregate signature representing these transactions—for simultaneous execution in one block of the blockchain; and validate (or invalidate) the transaction set according to evaluation of output conditions generated responsive to execution of target blockchain objects based on these transactions, thereby ensuring correct, atomic execution of these transactions in a single block of the blockchain.

The method S100 as described herein is executed by nodes to execute target blockchain objects in a distributed network extending a proof-of-space-based blockchain. However, nodes in a distributed network extending other types of blockchains (e.g., proof-of-work-based blockchain, proof-of-stake-based blockchain) can similarly execute Steps of the method S100 to: access transactions to execute target blockchain objects; generate output conditions and/or an updated object record responsive to execution of these target blockchain objects; validate transactions based on evaluation of these output conditions; and generate new blocks—including validated transactions and the updated object record—to extend the blockchain.

3. Terms

Generally, a "puzzle" as referred to herein is executable program code represented in a blockchain object.

Generally, a "solution" as referred to herein is a set of arguments passed to a puzzle for execution therewith.

Generally, a "condition" as referred to herein is an output responsive to execution of a puzzle according to a solution.

Generally, an "assertion" as referred to herein is an output, responsive to execution of a puzzle according to a solution, that is valid in response to evaluating to TRUE.

Generally, a "signature" as referred to herein is a mathematical scheme for verifying authenticity of digital messages and/or data.

Generally, a "cryptographic hash" as referred to herein is a one-way deterministic function that maps data to a bit array of a fixed size.

Generally, a "mempool" as referred to herein is a collection of pending transactions stored (e.g., in memory) by a full node (and/or by a set of full nodes) for confirmation and inclusion in a subsequent block on the blockchain.

4. Blockchain Structure

Generally, a distributed network includes nodes (e.g., computing devices) interconnected through a communication medium (e.g., the Internet, a wide area network, a local area network). Each node in the distributed network can: maintain a copy of a decentralized database (or "blockchain"); and participate in forming a trustless consensus regarding a state of the decentralized database.

Generally, a blockchain describes a data structure including a series of blocks. A block can include a set of transactions between addresses representing entities utilizing the blockchain. For example, these transactions can include cryptocurrency transactions and/or smart contracts that enforce specific node behavior.

4.1 Nodes

Generally, a distributed network can include a set of full nodes configured to execute a consensus protocol to extend a blockchain (e.g., a proof-of-space-based blockchain).

In one implementation, the set of full nodes can generate and add new blocks to the blockchain. For example, the set of full nodes can generate and add new blocks to the blockchain based on a proof-of-space.

More specifically, each full node in the set of full nodes can maintain a respective memory pool (hereinafter "mempool") including pending transactions for inclusion on the blockchain. The full node can receive transactions from the distributed network (e.g., via a gossip protocol with other nodes); validate the transactions; and add valid transactions to the respective mempool for inclusion in the blockchain. In particular, the full node can omit invalid transactions from the mempool, thus preventing inclusion of the invalid transactions in the blockchain. The full node can then: select a set of transactions from a mempool of pending transactions; generate a new block including the set of transactions; and add the new block to the blockchain.

4.2 Blockchain Objects

Generally, a node in the distributed network can submit a transaction (e.g., network message) to generate a blockchain object (e.g., coin, singleton) defining: a representation of program code (or a "puzzle hash"); a value representing an amount of an asset (e.g., an amount of a cryptocurrency); and/or a unique identifier (or "object ID") of the blockchain object.

A full node (or a subset of full nodes) in the distributed network can validate the transaction and generate a subsequent block—including the transaction—in the blockchain, thereby adding the blockchain object to a set of blockchain objects (e.g., a set of extant blockchain objects) on the blockchain. Additionally, the node can generate the subsequent block including an object record specifying the set of blockchain objects—including the newly generated blockchain object—on the blockchain.

Accordingly, nodes in the distributed network can access the object record, included in a block (e.g., a most current block) of the blockchain, to identify the set of blockchain objects—including the newly generated blockchain object—on the blockchain, each blockchain object in the set of blockchain objects specifying: a puzzle hash; a value representing an amount of an asset; and an object ID.

4.2.1 Puzzle Hash

Generally, a node can generate a blockchain object defining a puzzle. More specifically, a node can generate a blockchain object defining a puzzle defining compiled program code in a particular programming language (e.g., a Lisp-based programming language) associated with the blockchain.

In one implementation, a node can generate a blockchain object defining a puzzle hash representing a puzzle defining a set of instructions. More specifically, the node can: generate (or access) a cryptographic hash (e.g., SHA-256) of the puzzle; and generate the blockchain object defining the puzzle hash.

Accordingly, the node can generate the blockchain object defining the puzzle hash, rather than the entire puzzle, thereby compressing the puzzle to a fixed length while obscuring contents of the puzzle from public inspection.

In another implementation, a node can execute a blockchain object (i.e., execute the puzzle represented by the puzzle hash defined by the blockchain object). For example, a node can execute a first puzzle represented by a first puzzle hash defined by a first blockchain object to: generate a second blockchain object (or a group of blockchain objects) in a set of blockchain objects on the blockchain; and remove the first blockchain object from the set of blockchain objects. In this example, the node executes the first blockchain object to generate the second blockchain object, the first blockchain object characterized as a parent blockchain object of the second blockchain object.

4.2.2 Value

Generally, a node can generate a blockchain object defining a value representing an amount of an asset (e.g., an amount of a native cryptocurrency of the blockchain).

In one implementation, a first node can generate a first blockchain object—in a set of blockchain objects—defining a first value representing a first amount of an asset. A second node can then execute the first blockchain object to generate a second blockchain object defining a second value representing a second amount of the asset. More specifically, the second node can execute the first blockchain object to: generate the second blockchain—in the set of blockchain objects—defining the second value equal to the first value; and remove the first blockchain object from the set of blockchain objects, thereby transferring the first amount of the asset from the first blockchain object to the second blockchain object.

In another implementation, the second node can execute the first blockchain object to: generate a subset of blockchain objects in the set of blockchain objects, each blockchain object in the subset of blockchain objects defining a value representing a portion—in a set of portions—of the first amount of the asset; and removing the first blockchain object from the set of blockchain objects, thereby distributing the first amount of the asset from the first blockchain object to the group of blockchain objects.

In another implementation, a node can generate a blockchain object defining a value of zero, thereby enabling functionality independent of a transfer of value between blockchain objects. Thus, nodes in the distributed network can generate and/or execute blockchain objects to implement smart contracts, tokens, blockchain secured databases, etc.

4.2.3 Object ID

Generally, a node can generate a blockchain object defining an object ID uniquely identifying the blockchain object in a population of blockchain objects (e.g., a set of extant blockchain objects, blockchain objects removed from the set of extant blockchain objects).

In one implementation, a node can generate a first blockchain object defining: a first object ID based on a second object ID of a second blockchain object, the second blockchain object characterized as a parent blockchain object of the first blockchain object; a first puzzle hash; and a first value representing a first amount of an asset. More specifically, the node can generate the first blockchain object defining the first object ID based on a cryptographic hash of: the second object ID; the first puzzle hash; and the first value. For example, the node can: concatenate the first puzzle hash and the first value to the second object ID to generate a first string; generate a cryptographic hash of the first string to generate the first object ID; and generate the first blockchain object defining the first object ID.

Accordingly, by generating a blockchain object defining an object ID based on a parent blockchain object, the node can generate a permanent and/or immutable record over multiple blocks and/or multiple generations of blockchain objects (i.e., a chain of origin) for each blockchain object on the blockchain.

In one variation, a node can a generate a first blockchain object defining a first object ID based on a second blockchain object, the second blockchain object—characterized as a parent blockchain object of the first blockchain object—defining a second object ID, a second puzzle hash, and a second value. More specifically, the node can generate the first blockchain object defining the first object ID based on a cryptographic hash of: the second object ID; the second puzzle hash; and the second value. For example, the node can: concatenate the second puzzle hash and the second value to the second object ID to generate a first string; generate a cryptographic hash of the first string to generate the first object ID; and generate the first blockchain object defining the first object ID.

Additionally or alternatively, upon generation of a new block by a node extending the blockchain, the node generates an initial blockchain object that can only be executed by a user associated with the node as a reward for participating in the consensus algorithm. For this initial blockchain object, the node can calculate an initial object ID based on some unique characteristic of the new block. Thus, any node can identify the source of the initial blockchain object as the new block.

5. Transactions

Steps of the method S100 recite: accessing a first transaction to execute a first target blockchain object in Step S102, the first transaction defining a first target object ID and a first target puzzle defining a first set of instructions; generating a first target puzzle hash based on the first target puzzle in Step S110; and identifying a first blockchain object in a set of blockchain objects in Step S116, the first blockchain object defining a first object ID and a first puzzle hash representing a first puzzle.

Steps of the method S100 recite, in response to detecting a match between the first target object ID and the first object ID, and in response to detecting a match between the first target puzzle hash and the first puzzle hash: generating a second blockchain object in the set of blockchain objects in Step S120, the second blockchain object defining a second object ID based on the first object ID and a second puzzle hash representing a second puzzle based on the first puzzle; and removing the first blockchain object from the set of blockchain objects in Step S126.

Generally, as shown in FIG. 1, a node can access (or receive) a transaction to execute a target blockchain object. More specifically, a node can access a transaction defining a set of features including a target object ID, a target puzzle, a set of arguments (or a "solution") for the target puzzle, and/or a signature. Based on the set of features, the node can: identify a blockchain object on the blockchain with which the transaction is associated; validate the transaction; execute the target puzzle according to the solution to generate a set of outputs (or a set of "conditions"); and generate a subsequent block—including the transaction—of the blockchain. Additionally, the node can generate the subsequent block defining the set of conditions.

5.1 Transaction Selection

In one implementation, in Step S102, a node can access a first transaction to execute a target blockchain object, the transaction defining a target object ID, a target puzzle, a solution for the target puzzle, and/or a signature. For example, the node can receive the first transaction from another node in the distributed network.

In another implementation, the node can access the first transaction characterized by a fee amount collectable by the node (i.e., by an address associated with the node) upon execution of the transaction and/or execution of the target blockchain object. In this implementation, the node can calculate a return (e.g., fee amount) per computational load for the first transaction; and select the first transaction—in a population of transactions—based on a return per computational load for the first transaction exceeding returns per computational load for other transactions in the population of transactions, thereby maximizing fees collected by the address associated with the node.

5.2.1 Target Object ID

Step S114 of the method S100 recites accessing a first block of the blockchain, the first block including a first object record specifying the set of blockchain objects including the first blockchain object.

Generally, a node can access a transaction defining a target object ID that uniquely identifies a target blockchain object to be executed in conjunction with the transaction. More specifically, the node can identify a particular blockchain object—in a set of blockchain objects on the blockchain—based on a match between the target object ID and an object ID of the particular blockchain object.

In one implementation, in Step S114, a node can access an object record specifying the set of blockchain objects on the blockchain, each blockchain object—in the set of blockchain objects—defining a puzzle hash, a value representing an amount of an asset, and/or an object ID. For example, the node can access the object record included in a prior block (e.g., a most recent block) of the blockchain.

In another implementation, in Step S116, the node can identify a first blockchain object in the set of blockchain objects, the first blockchain object defining a first object ID.

The node can then detect a match between the target object ID and the first object ID. In response to detecting a match between the target object ID and the first object ID, the node can further validate the transaction as described below. Alternatively, in response to failing to detect a match between the target object ID and an object ID of any blockchain object in the set of blockchain objects, the node can invalidate and/or abort the transaction.

Accordingly, by matching a target object ID defined in a transaction with an object ID of an extant blockchain object, nodes of the distributed network can ensure that a target blockchain object is extant on the blockchain and executed (or "spent") only once.

5.2.2 Target Puzzle

Generally, a node can access a transaction—to execute a target blockchain object—defining a target puzzle, the target puzzle defining a set of instructions (e.g., complete compiled source code for the target blockchain object in a particular programming language associated with the blockchain).

In one implementation, in Step S110, a node can generate a target puzzle hash based on the target puzzle. For example, the node can generate a target puzzle hash based on a cryptographic hash (e.g., SHA-256) of the target puzzle. The node can then detect a match between the target puzzle hash and a first puzzle hash defined by a first blockchain object (e.g., a blockchain object defining an object ID matching the target object ID defined the transaction) in the set of blockchain objects. In response to detecting a match between the target puzzle hash and the first puzzle hash, the node can further validate (or execute) the transaction as described below. Alternatively, in response to failing to detect a match between the target puzzle hash and the first puzzle hash of the first blockchain object, the node can invalidate and/or abort the transaction. Therefore, the node can execute a target blockchain object according to its intended functionality (i.e., puzzle) and prevent malicious actors from modifying the intended functionality of the target blockchain object during execution.

In another implementation, a node can execute the target puzzle defined in a particular transaction to evaluate a set of computational resources and/or an amount of time required to execute the target puzzle. The node can: access a fee amount for the particular transaction; and calculate a return per computational load for the particular transaction based on the set of computational resources and the fee amount. Additionally or alternatively, the node can detect that the target puzzle completes execution absent errors within a threshold amount of time (or fails to complete execution within the threshold amount of time).

In another implementation, a node can execute a puzzle programmed in a Lisp-based programming language to further facilitate the passage of functions or other program code as an input to a puzzle of a blockchain object. The node can execute a puzzle with any programmatic functionality supported by the processing capabilities, networking capabilities, and/or data available to the node, such that the node can complete execution of all transactions and generate a new block within the time allotted by the consensus algorithm of the blockchain.

5.3 Blockchain Object Addition & Removal

Generally, a node can execute a target puzzle in response to detecting a match between a target object ID and an object ID of a particular blockchain object in a set of blockchain objects and, in response to detecting a match between a target puzzle hash and a puzzle hash of the particular blockchain object. More specifically, in response to detecting a match between a target object ID and an object ID of a particular blockchain object in a set of blockchain objects, and in response to detecting a match between a target puzzle hash a puzzle hash of the particular blockchain object, a node can: generate a new blockchain object in the set of blockchain objects; and/or remove the particular blockchain object from the set of blockchain objects.

In one implementation, in response to detecting a match between a target object ID and a first object ID defined by a first blockchain object in a set of blockchain objects, and in response to detecting a match between a target puzzle hash and a first puzzle hash—representing a first puzzle—defined by the first blockchain object, a node can generate a second blockchain object in the set of blockchain objects in Step S120. More specifically, the node can generate the blockchain object defining: a second object ID based on the first object ID; and a second puzzle hash representing a second puzzle based on the first puzzle. Additionally, in Step S126, the node can remove the first blockchain object from the set of blockchain objects.

In another implementation, a node can generate (or update) an object record specifying the set of blockchain objects in response to executing a puzzle hash. For example, in response to generating the second blockchain object from the set of blockchain objects and removing the first blockchain object from the set of blockchain objects, the node can generate an object record—for inclusion in a subsequent block of the blockchain—specifying the set of blockchain objects including second blockchain object and excluding the first blockchain object.

5.3.1 Value Transfer

Step S116 of the method S100 recites identifying the first blockchain object further defining a first value representing a first amount of an asset.

Step S120 of the method S100 recites generating the second blockchain object defining the second object ID based on a cryptographic hash of: the first object ID; the second puzzle hash; and a second value representing a second amount of the asset.

Generally, a node in the distributed network can execute a target blockchain object to transfer value from the target blockchain object to a new blockchain object. More specifically, the node can execute a target blockchain object—defining a first value representing a first amount of an asset—to: generate a new blockchain object defining a second value representing a second amount of the asset; and remove the target blockchain object.

In one implementation, a node can: access a transaction in Step S102; and identify a first blockchain object in a set of blockchain objects in Step S116, the first blockchain object defining a first object ID, a first puzzle hash representing a first puzzle, and a first value representing a first amount of an asset.

In another implementation, in Step S120, the node can generate a second blockchain object—in the set of blockchain objects—defining: a second object ID based on the first object ID; a second puzzle hash; and a second value (e.g., a second value equal to the first value, a second value exceeding the first value, a second value falling below the first value) representing a second amount of the asset. Additionally, in Step S126, the node can remove the first blockchain object from the set of blockchain objects.

Accordingly, by generating a second blockchain object—defining the second value—and removing the first blockchain object defining the first value, the node can execute (or "spend") the first blockchain object to transfer the first value (or a portion thereof) defined in the first blockchain object to the second blockchain object defining the second value.

In another implementation, the node can generate the second blockchain object defining the second object ID based on a cryptographic hash of: the first object ID; the second puzzle hash; and the second value. Therefore, the node can generate a permanent and/or immutable record of a chain of origin of the second blockchain object (and any further blockchain objects generated via execution of the second blockchain object).

Figure 2:
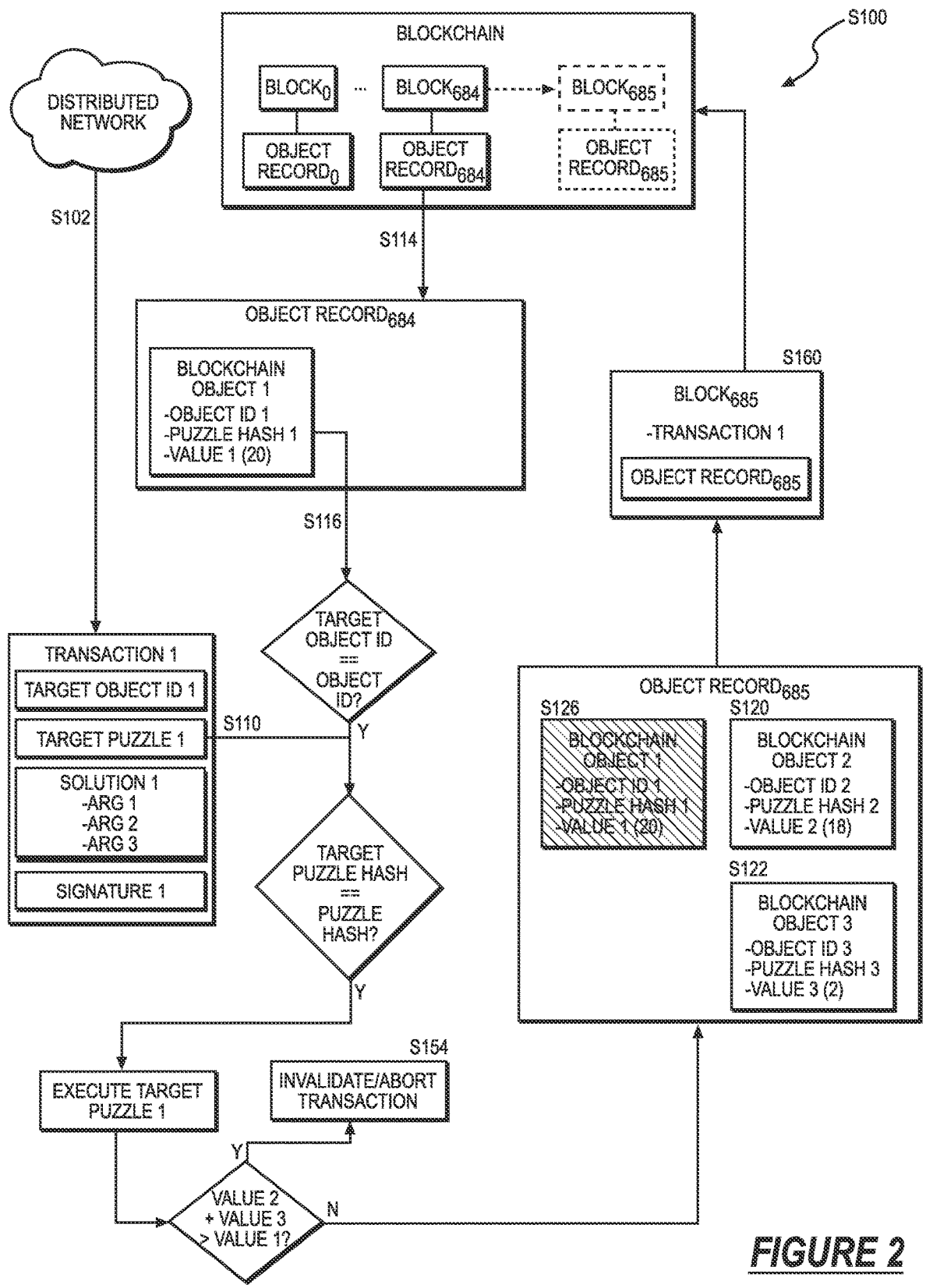
FIG. 2 is a flowchart representation of one variation of the method.

In one variation, as shown in FIG. 2, a node can execute a target blockchain object—defining a first value representing a first amount of an asset—to generate multiple blockchain objects, such as: a second blockchain object defining a second value representing a second amount of the asset; and a third blockchain object defining a third value representing a third amount of the asset.

For example, the node can: access a transaction in Step S102; identify a first blockchain object in a set of blockchain objects in Step S116, the first blockchain object defining a first object ID, a first puzzle hash representing a first puzzle, and a first value representing a first amount of an asset (e.g., 20 mojos), the first value characterized by a sum of a second value representing a second amount of the asset (e.g., 18 mojos) and a third value representing a third amount of the asset (e.g., 2 mojos, a fee amount). The node can: generate a second blockchain object, in the set of blockchain objects, defining a second object ID based on the first object ID, a second puzzle hash representing a second puzzle based on the first puzzle, and the second value in Step S120; and generate a third blockchain object, in the set of blockchain objects, defining a third object ID based on the first object ID, a third puzzle hash representing a third puzzle based on the first puzzle, and the third value in Step S124. Additionally, in Step S126, the node can remove the first blockchain object from the set of blockchain objects.

Accordingly, the node can execute a target blockchain object to generate multiple new blockchain objects and remove the target blockchain object, thereby distributing a value defined by the target blockchain object between these new blockchain objects.

6. Solutions

Steps of the method S100 recite: accessing the first transaction further defining a solution representing a set of arguments associated with the first target puzzle in Step S102; and generating an output in response to executing the first target puzzle based on the solution in Step S140.

Step S120 of the method S100 recites generating the second blockchain object in the set of blockchain objects in response to: detecting a match between the first target object ID and the first object ID; detecting a match between the first target puzzle hash and the first puzzle hash; and evaluating the output as true.

In one implementation, in Step S102, a node can access a transaction defining a target puzzle and a solution representing a set of arguments associated with the target puzzle. In Step S140, the node can: pass the solution to the target puzzle; execute the target puzzle based on the solution; and generate an output in response to executing the target puzzle based on the solution.

Generally, the node can evaluate the output to detect that a particular solution defined in a transaction is a correct solution to the target puzzle (or is an incorrect solution to the target puzzle). More specifically, in response to evaluating the output as TRUE, the node can: detect that the solution defined in the transaction is a correct solution for the target puzzle; and generate a set of conditions specified by the target puzzle based on the solution. For example, in response to evaluating the output as TRUE, the node can: generate the second blockchain object in the set of blockchain objects in Step S120; and remove the first blockchain object from the set of blockchain objects in Step S126. Therefore, the node can successfully execute the target puzzle in response to a complete and correct set of inputs.

Alternatively, in response to evaluating the output as FALSE, the node can: detect that the solution defined in the transaction is an incorrect solution for the target puzzle; and invalidate and/or abort the transaction. In one variation, in response to evaluating the output as FALSE, the node can execute functionality defined in the target puzzle based on an incorrect solution.

In one implementation in which a programming language associated with the blockchain is a Lisp-based programming language, the node can receive a transaction defining a solution representing a set of arguments in a form of programming objects (e.g., integers, floats, lists) or program code to be executed within the target puzzle. Thus, in this implementation, the transaction and the target blockchain object can each include separate functionality that affects a set of conditions generated during execution of the transaction and the target blockchain object by a node.

7. Conditions

Generally, a node can generate a set of conditions according to execution of a target blockchain object based on a solution defined in a transaction. For example, the node can generate the set of conditions including assertion conditions (or "assertions"), announcement conditions (or "announcements"), and/or object generation conditions, as described below.

7.1 Assertions

Steps of the method S100 recite, in response to detecting a match between the first target object ID and the first object ID, and in response to detecting a match between the first target puzzle hash and the first puzzle hash: generating a set of assertions in response to executing the first target puzzle in Step S144; and validating the first transaction in response to evaluating each assertion in the set of assertions as true in Step S150.

Generally, a node can generate an assertion condition (or an "assertion")— based on execution of a target blockchain object—to validate execution of the target blockchain object.

In one implementation, in Step S144, a node can generate a set of assertions in response to executing a target blockchain object (i.e., executing a target puzzle defined in a transaction), each assertion specifying a requirement for execution of the target blockchain object (and/or the transaction) to be valid. For example, the node can generate a time assertion specifying the transaction is valid in response to a timestamp corresponding to a prior block (e.g., a most recent block) exceeding a predefined timestamp. More specifically, the node can generate a time assertion specifying the transaction is valid only if a timestamp corresponding to a prior block exceeds a predefined timestamp.

The node can evaluate each assertion in the set of conditions to detect that execution of the target blockchain object is valid (or invalid). Additionally or alternatively, the node can evaluate each assertion in the set of conditions to detect that the transaction to execute the target blockchain object is valid (or invalid).

In one implementation, in response to evaluating each assertion in the set of conditions as TRUE, the node can: identify execution of the target blockchain object as valid; validate the transaction in Step S150; add the transaction to the mempool for inclusion in a subsequent block of the blockchain; and/or generate a block of the blockchain including the transaction. Alternatively, in response to evaluating any assertion in the set of conditions as FALSE, the node can: identify execution of the target blockchain object as valid; invalidate the transaction; abort the transaction; and/or generate a block of the blockchain excluding the transaction.

Accordingly, nodes in the distributed network can execute blockchain objects and/or transactions that implement dependencies on other blocks, blockchain objects, and/or other transactions.

TABLE 1 depicts an example set of assertion conditions and corresponding logical assertions, any combination of which can be output via execution of a target blockchain object by a node.

TABLE 1

| Assertion Condition: | Logical Assertion and Evaluation: |
| --- | --- |
| Signature Inclusion Assertion | This execution of the target blockchain object based on a corresponding transaction is valid only if it includes a signature associated with a specified public key. |
| Reserve Fee Assertion | This execution of the target blockchain object based on a corresponding transaction is valid only if there is unused value in the set of transactions greater than or equal to a specified amount (for use as a fee). |
| Object Announcement Assertion | This execution of the target blockchain object based on a corresponding transaction is valid only if the set of conditions includes an announcement including a specified object ID. |
| Puzzle Announcement Assertion | This execution of the target blockchain object based on a corresponding transaction is valid only if the set of conditions includes an announcement including a specified puzzle hash. |
| Object ID Assertion | This execution of the target blockchain object based on a corresponding transaction is valid only if the target object ID of the transaction matches the object ID of the target blockchain object. |
| Parent ID Assertion | This execution of the target blockchain object based on a corresponding transaction is valid only if the target object ID of the transaction matches the parent ID of the target blockchain object. |
| Puzzle Hash Assertion | This execution of the target blockchain object based on a corresponding transaction is valid only if the target puzzle of the transaction matches the puzzle hash of the target blockchain object. |
| Value Assertion | This execution of the target blockchain object based on a corresponding transaction is valid only if the specified value matches the value of the target blockchain object. |
| Time Assertion | This execution of the target blockchain object based on a corresponding transaction is valid only if a timestamp of a prior block exceeds a specified timestamp (either relative or absolute time). |
| Block Height Assertion | This execution of the target blockchain object based on a corresponding transaction is valid only if a block height of a prior block exceeds a specified block height (either relative or absolute height). |

7.1.1 Signature Inclusion Assertion

Steps of the method S100 recite: generating a signature inclusion assertion in response to executing the first target puzzle, the signature inclusion assertion specifying the first transaction is valid in response to the first transaction defining a signature associated with a first public key in Step S144; and accessing the first transaction further defining a first signature associated with the first public key in Step S102.

Step S120 of the method S100 recites generating the second blockchain object in the set of blockchain objects in response to: detecting a match between the first target object ID and the first object ID; detecting a match between the first target puzzle hash and the first puzzle hash; and detecting the first transaction defining the first signature associated with the first public key.

Generally, a node can generate a signature inclusion assertion specifying execution of a target blockchain object based on a corresponding transaction is valid in response to the transaction including a signature associated with a particular public key. More specifically, a node can generate a signature inclusion assertion specifying execution of a target blockchain object based on a corresponding transaction is valid only if the transaction includes a signature associated with a particular public key. Accordingly, a node can generate a blockchain object that implements a signature inclusion assertion during execution, thereby ensuring that the blockchain object can only be executed based on a transaction with appropriate permission (e.g., a transaction including a signature associated with the particular public key).

In one implementation, in Step S102, a node can access a first transaction—defining a target puzzle and a first signature associated with a first public key—to execute a target blockchain object. In Step S144, the node can execute the target puzzle and generate a signature inclusion assertion specifying the first transaction is valid in response to the first transaction defining a signature associated with a first public key. The node can evaluate the signature inclusion assertion and the first signature defined in the first transaction. In response to detecting the first signature—associated with the first public key—defined in the first transaction, the node can: evaluate the signature inclusion assertion as TRUE; generate a new blockchain object in the set of blockchain objects in a set of blockchain objects in Step S120; and/or remove the target blockchain object from the set of blockchain objects in Step S126.

Alternatively, in response to detecting the transaction excluding a signature associated with the first public key, the node can: evaluate the signature inclusion assertion as FALSE; identify execution of the target blockchain object as invalid; invalidate the first transaction; and/or abort the first transaction.

7.2 Announcements

Steps of the method S100 recite: accessing a second transaction to execute a third target blockchain object in Step S104, the third blockchain object defining a third puzzle hash representing a third puzzle including a second set of instructions; and generating a set of conditions in response to executing the third puzzle in Step S142, the set of conditions including an announcement assertion specifying the second transaction is valid in response to the set of conditions including an announcement specifying the first puzzle hash.

Steps of the method S100 recite: generating the set of conditions in response to executing the first target puzzle in Step S142, the set of conditions further including a first announcement specifying the first puzzle hash; and validating the second transaction in response to detecting the first announcement specifying the first puzzle hash in Step S152.

Steps of the method S100 recite: generating the set of conditions in response to executing the first target puzzle in Step S142, the set of conditions excluding an announcement specifying the first puzzle hash; and identifying the second transaction as an invalid transaction in response to detecting the set of conditions excluding an announcement specifying the first puzzle hash in Step S156.

Figure 3:
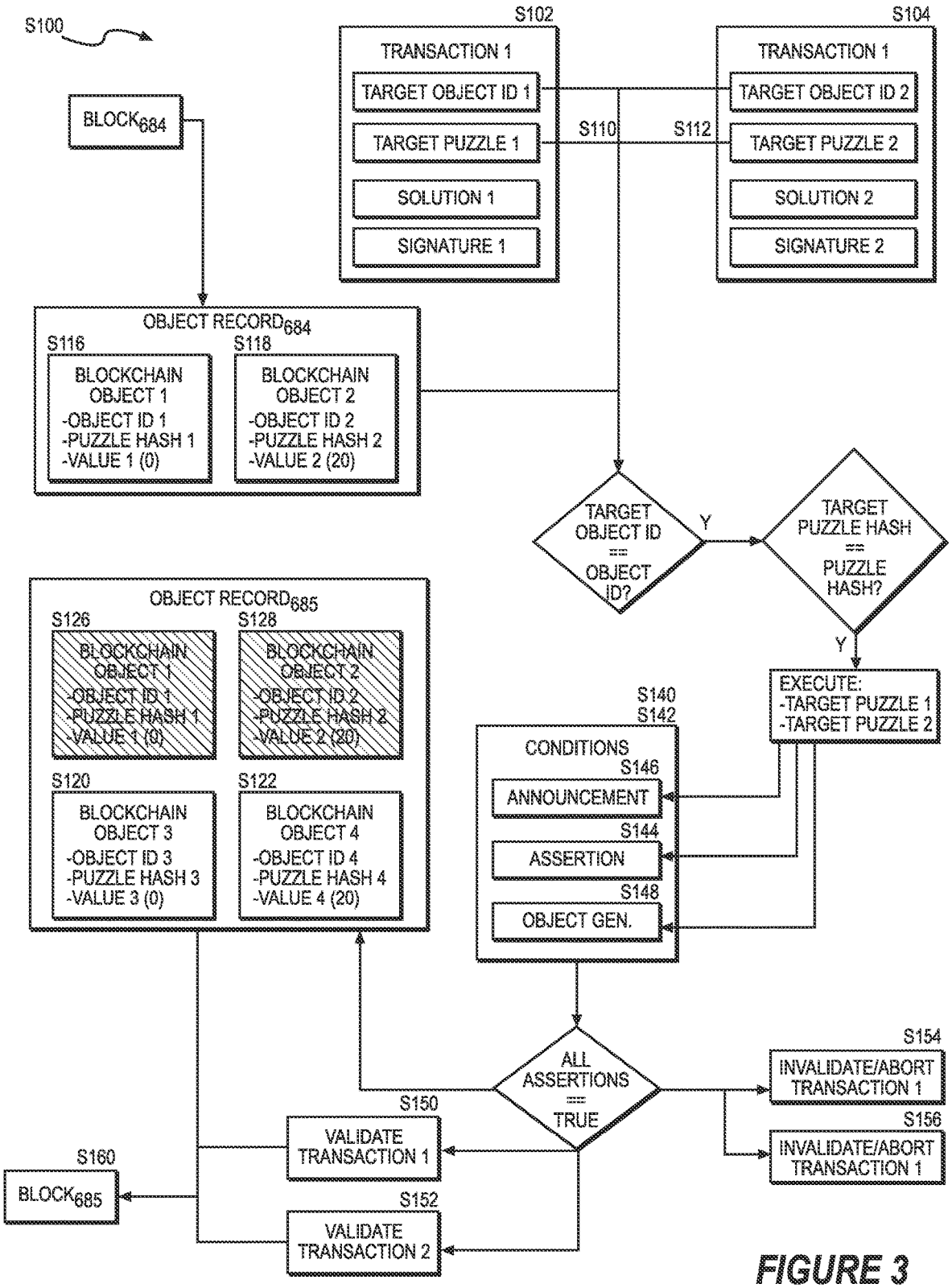
FIG. 3 is a flowchart representation of one variation of the method.

Generally, as shown in FIG. 3, a node can generate an announcement based on execution of a target blockchain object to enable dependency between transactions and/or blockchain objects executed within the same block of the blockchain. More specifically, the node can generate the announcement in response to executing a target puzzle parameterized by a solution.

In one implementation, in Step S102, a node can access a first transaction—defining a first target puzzle—to execute a first target blockchain object (e.g., a first blockchain object defining a first object ID and a first puzzle hash). The node can also access a second transaction to execute a second target blockchain object (e.g., a second blockchain object defining a second object ID and a second puzzle hash) in Step S104, the second transaction defining a second target puzzle. In Step S142, the node can: execute the first target puzzle and the second target puzzle; and generate a set of conditions.

More specifically, the node can generate the set of conditions including an announcement assertion—responsive to executing the first target puzzle—specifying the first transaction is valid in response to the set of conditions including an announcement specifying a particular puzzle hash (e.g., the second puzzle hash). In this implementation, the node can generate the set of conditions further including an announcement—responsive to executing the second target puzzle—specifying the second puzzle hash. In response to detecting the set of conditions including the announcement assertion and the announcement corresponding to the announcement assertion, the node can: evaluate the announcement assertion as TRUE; identify execution of the first target blockchain object (and the second target blockchain object) as valid; and/or validate the first transaction (and the second transaction) in Step S150.

Alternatively, in one variation absent the second transaction (and absent execution of the second target puzzle), in response to detecting the set of conditions excluding an announcement specifying the first puzzle hash, the node can: evaluate the announcement assertion as FALSE; identify execution of the first target blockchain object (and the first transaction) as invalid in Step S154; invalidate the first transaction; and/or abort the first transaction.

In one implementation, in response to evaluating each assertion in the set of conditions as TRUE, the node can: identify execution of the target blockchain object as valid; validate the transaction in Step S150; add the transaction to the mempool for inclusion in a subsequent block of the blockchain; and/or generate a block of the blockchain including the transaction. Alternatively, in response to evaluating any assertion in the set of conditions as FALSE, the node can: identify execution of the target blockchain object as valid; invalidate the transaction; abort the transaction; and/or generate a block of the blockchain excluding the transaction.

Accordingly, nodes of the distributed network can submit (and/or execute) transactions to execute multiple related and/or interdependent blockchain objects, thereby enabling functionality of the blockchain to implement smart transactions, exchange of cryptocurrency and/or other assets, generation of tokens (e.g., fungible tokens, non-fungible tokens), etc.

7.3 Object Generation

Step S140 of the method S100 recites generating the output in response to executing the first target puzzle based on the solution, the output comprising a condition representing generation of the second blockchain object.

Generally, a node can generate an object generation condition based on execution of a target blockchain object that specifies a new blockchain object in a set of blockchain objects if a set of assertion conditions associated with the target blockchain object evaluate to TRUE.

In one implementation, in Step S148, a node can generate an object generation condition in response to executing a target puzzle based on a solution defined in a transaction, the object generation condition specifying an object ID, a puzzle hash, and/or a value of a new blockchain object generated responsive to execution of the target puzzle.

For example, a node can: access a transaction—defining a target puzzle—to execute a target blockchain object; identify a first blockchain object—corresponding to the target blockchain object—defining a first object ID, a first puzzle hash, and a first value representing a first amount of an asset; execute the target puzzle; and generate a second blockchain object specifying a second object ID, a second puzzle hash, and a second value representing a second amount of an asset. More specifically, in response to executing the target puzzle, the node can generate an object generation condition specifying the second object ID, the second puzzle hash, and the second value. Accordingly, the node can output a condition representing generation of the second blockchain object in response to executing the target puzzle.

In another implementation, a node can generate (or update) an object record based on the object generation condition. More specifically, the node can evaluate each assertion in the set of conditions and, in response to evaluating each assertion in the set of conditions as TRUE, the node can generate an object record—based on the object generation condition—for inclusion in a subsequent block of the blockchain.

8. New Block Generation

Step S160 of the method S100 recites generating a second block of the blockchain including a second object record specifying the set of blockchain objects including the second blockchain object and excluding the first blockchain object.

In one implementation, in Step S160, in response to executing a target blockchain object based on a transaction and validating the transaction, a node can generate a new block—including the transaction—for inclusion on the blockchain.

Additionally or alternatively, a node can generate (or update) an object record in response to generating a new blockchain object in a set of blockchain objects (e.g., a set of extant blockchain objects) and/or removing a blockchain object from the set of blockchain objects. The node can then generate a new block of the blockchain including the object record in Step S160.

9. Transaction Sets

Figure 4:
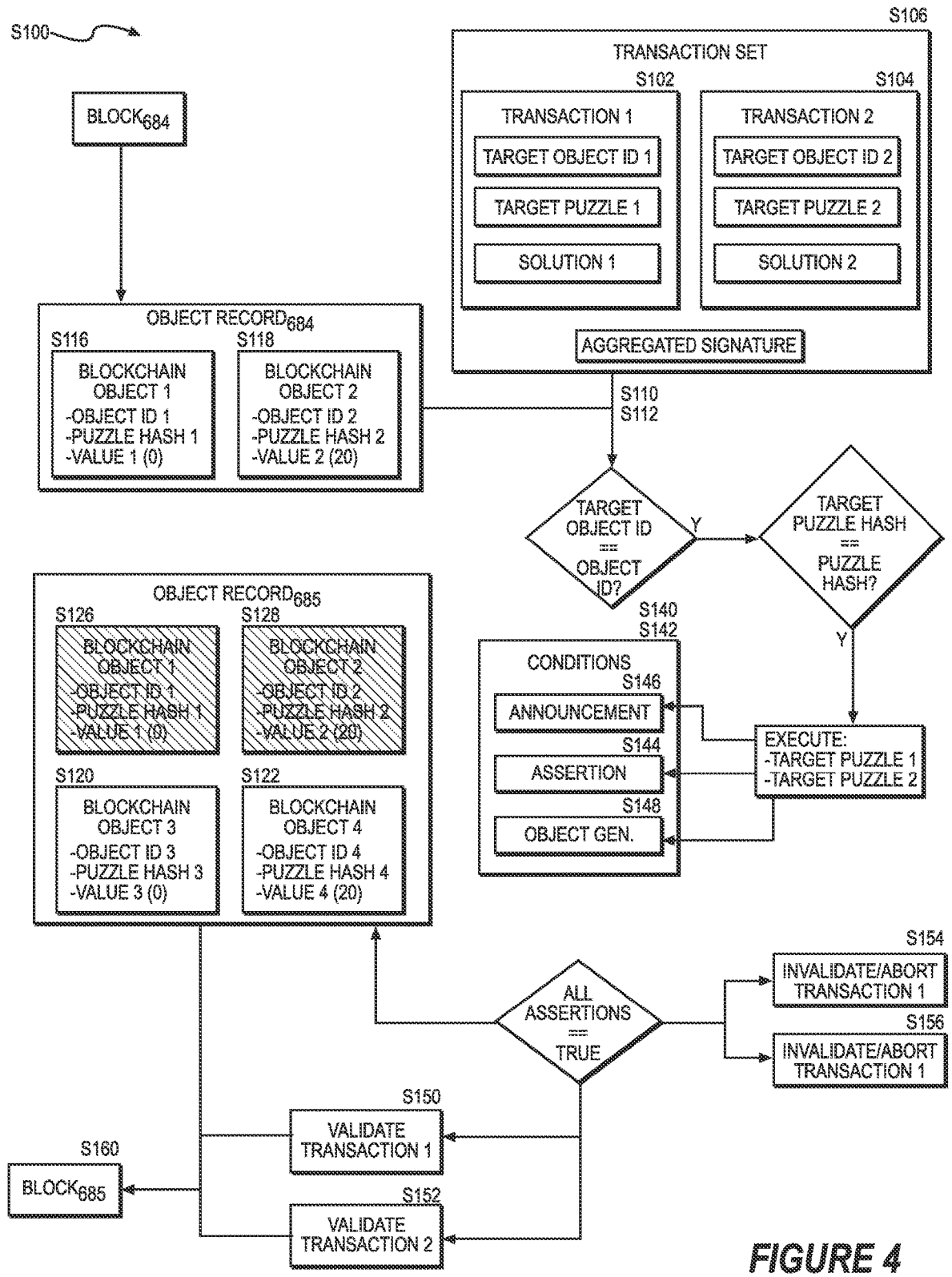
FIG. 4 is a flowchart representation of one variation of the method.

Generally, as shown in FIG. 4, a node can access a transaction set including multiple transactions for simultaneous execution in one block of the blockchain, such as related and/or interdependent transactions, where each transaction in the transaction set must be valid for the transaction set to be valid. More specifically, in response to identifying each transaction in the transaction as valid, the node can validate the transaction set and generate a new block—including the transaction set—for inclusion on the blockchain. However, in response to identifying any transaction in the transaction set as invalid, the node can invalidate the transaction set (and the transaction included in the transaction set) and/or abort the transaction set. Therefore, the node can ensure correct, atomic execution of these transactions in a single block of the blockchain.

9.1 Transaction Set Selection

In one implementation, in Step S106, a node can access a transaction set including: a first transaction to execute a first blockchain object, the first transaction defining a first target object ID and a first target puzzle defining a first set of instructions; and a second transaction to execute a second blockchain object, the second transaction defining a second target object ID and a second target puzzle defining a second set of instructions. The node can access the transaction set further including additional transactions to execute additional target blockchain objects.

In another implementation, the node can execute methods and techniques described above to select the transaction set based on a return per computation load for the transaction set. More specifically, the node can calculate a return (e.g., fee amount) per computational load for the transaction set; and select the transaction set—in a population of transactions (and/or transaction sets)—based on a return per computational load for the transaction set exceeding returns per computational load for other transactions in the population of transactions, thereby maximizing fees collected by the address associated with the node.

9.2 Condition Evaluation and Validation

Step S146 of the method S100 recites, in response to detecting a match between the first target object ID and the first object ID, and in response to detecting a match between the first target puzzle hash and the first puzzle hash, generating an announcement specifying the first object ID.

Steps of the method S100 recite, in response to detecting a match between the second target object ID and the second object ID, in response to detecting a match between the second target puzzle hash and the second puzzle hash, and in response to detecting the announcement specifying the first object ID: generating a third blockchain object, in the set of blockchain objects, based on the second blockchain object in Step S122; and removing the second blockchain object from the set of blockchain objects in Step S128.

Generally, a node can implement methods and techniques described above to: access a transaction set including multiple transactions to execute target blockchain objects; identify extant blockchain objects corresponding to these target blockchain objects (e.g., based on a match between a target object ID defined in a transaction and an object ID of an extant blockchain); and execute target puzzles defined in the transactions to generate a set of conditions. Additionally, the node can execute methods and techniques described above to: evaluate a set of conditions in response to executing target puzzles defined in a transaction set; validate a transaction set in response to evaluating each assertion in the set of conditions as TRUE; and/or invalidate the transaction set in response to evaluating any assertion in the set of conditions as FALSE.

More specifically, the node can: generate a first target puzzle hash based on a first target puzzle defined in a first transaction in Step S110; generate a second target puzzle hash based on a second target puzzle defined in a second transaction in Step S112; identify a first blockchain object in a set of blockchain objects in Step S116, the first blockchain object defining a first object ID and a first puzzle hash representing a first puzzle; and identify a second blockchain object in the set of blockchain objects in Step S118, the second blockchain object defining a second object ID and a second puzzle hash representing a second puzzle. Additionally, the node can detect: a match between the first target puzzle hash and the first puzzle hash; and a match between the second target puzzle hash and the second puzzle hash.

In one implementation, the node can execute the first target puzzle and the second target puzzle to generate a set of conditions. More specifically, in Step S144, in response to executing the second target puzzle, the node can generate an announcement assertion specifying the second transaction is valid in response to the set of conditions including an announcement specifying the first object ID. Additionally, in Step S146, the node can generate an announcement specifying the first object ID in response to executing the first target puzzle.

In another implementation, the node can evaluate the set of conditions in response to executing the first target puzzle and the second target puzzle. For example, the node can evaluate the set of conditions including the announcement assertion and the announcement. In response to detecting the announcement specifying the first object ID, the node can: evaluate the announcement assertion as TRUE; identify the transaction set as valid; and/or validate the transaction set.

Additionally or alternatively, in response to evaluating each assertion in the set of conditions as true (e.g., by detecting the announcement specifying the first object ID), the node can execute methods and techniques described above to: generate a third blockchain object based on the first blockchain object, the third blockchain defining a third object ID based on the first object ID, a third puzzle hash representing a third puzzle based on the first puzzle, and/or a third value (e.g., zero) representing a third amount of an asset; generate a fourth blockchain object based on the second blockchain object, the fourth blockchain object defining a fourth object ID based on the second object ID, a fourth puzzle hash representing a fourth puzzle based on the second puzzle, and/or a fourth value representing a fourth amount of an asset; remove the first blockchain object from the set of blockchain objects; and/or remove the second blockchain object from the set of blockchain objects.

In one implementation, the node verifies, upon evaluation of the set of conditions, that a total value of new blockchain objects does not exceed a total value of the target blockchain objects, thereby preventing double-spending by any entity submitting transactions to the blockchain. Additionally or alternatively, upon identifying the total value of the new blockchain objects falling below the total value of the target blockchain objects, the node can generate a blockchain object securing the unallocated value (e.g., the difference between the total value of the new blockchain objects and the total value of the target blockchain objects) for access via a user address associated with the node. Thus, in this implementation, the node neither creates nor destroys value by executing the target blockchain objects. Additionally, the node can verify that the total value of the new blockchain objects generated as a result of executing a transaction set for a new block does not exceed to total value of the blockchain objects removed from the set of blockchain objects as a result of executing the transaction set.

In another implementation, in response to generating the third blockchain object and the fourth blockchain object in the set of blockchain objects, and in response to removing the first blockchain object and the second blockchain object from the set of blockchain objects, the node can execute methods and techniques described above to generate an object record: including the third blockchain object and the fourth blockchain object; and excluding the first blockchain object and the second blockchain object. In Step S160, the node can generate a block (e.g., based on a proof-of-space)—including the object record and/or the transaction set—for inclusion on the blockchain.

9.2.1 Aggregate Signature

Steps of the method S100 recite: generating a signature inclusion assertion in response to executing the first target puzzle and the second target puzzle, the signature inclusion assertion specifying the transaction set is valid in response to the transaction set defining a signature associated with a first public key and a second public key in Step S144; and accessing the transaction set further including a first signature associated with the first public key and the second public key in Step S106.

Step S122 of the method S100 recites generating the third blockchain object, in the set of blockchain objects, based on the second blockchain object in response to: detecting a match between the second target object ID and the second object ID; detecting a match between the second target puzzle hash and the second puzzle hash; detecting the announcement specifying the first object ID; and detecting the transaction set defining the first signature associated with the first public key and the second public key.

Generally, a node can execute methods and techniques discussed above to: access a transaction set including a signature associated with a particular public key(s); and evaluate a signature inclusion assertion(s) generated in response to target blockchain object execution based on a transaction set.

More specifically, in response to executing the first target puzzle and the second target puzzle, the node can generate: a first signature inclusion assertion specifying execution of the first target blockchain object based on the first transaction is valid in response to the transaction including a signature associated with a first public key; and a second signature inclusion assertion specifying execution of the second target blockchain object based on the second transaction is valid in response to the transaction including a signature associated with a second public key.

In one implementation, the node (e.g., the node receiving a block) can access the transaction set including a signature associated with the first public key and the second public key. The node can evaluate these signature inclusion assertions and the first signature defined in the transaction set. In response to detecting the first signature associated with the first public key and the second public key, the node can: evaluate both signature inclusion assertions as TRUE; generate the third blockchain object and the fourth blockchain object in the set of blockchain objects in a set of blockchain objects; and/or remove the first blockchain object and the second blockchain object from the set of blockchain objects.

Accordingly, by implementing an aggregated signature associated with both required public keys—rather than individual signatures associated with each required public key—in a transaction set, nodes in the distributed network can reduce an amount of data transmitted and/or stored in connection with the transaction set, thereby reducing an amount of disk space required to store the blockchain.

10. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for extending a blockchain in a distributed network, the method comprising, by a node in the distributed network:
    accessing a first transaction to execute a first target blockchain object, the first transaction defining:
        a first target object identifier; and
        a first target puzzle defining a first set of instructions;
    generating a first target puzzle hash based on a cryptographic hash of the first set of instructions;
    identifying a first blockchain object in a set of blockchain objects, the first blockchain object defining:
        a first object identifier; and
        a first puzzle hash representing a first puzzle defining a second set of instructions;
    in response to detecting equivalence between the first target object identifier and the first object identifier, and in response to detecting equivalence between the first target puzzle hash and the first puzzle hash:
        executing the first set of instructions, defined by the first target puzzle, that generates a first announcement specifying the first puzzle hash;
        generating a second blockchain object in the set of blockchain objects, the second blockchain object defining:
            a second object identifier based on the first object identifier; and
            a second puzzle hash representing a second puzzle based on the first puzzle; and
        removing the first blockchain object from the set of blockchain objects;
    accessing a second transaction to execute a second target blockchain object, the second transaction defining a second target puzzle defining a third set of instructions;
    generating a second target puzzle hash based on a cryptographic hash of the third set of instructions;
    identifying a third blockchain object in the set of blockchain objects, the third blockchain object defining a third puzzle hash representing a third puzzle defining a fourth set of instructions;
    in response to detecting equivalence between the second target puzzle hash and the third puzzle hash:
        executing the third set of instructions, defined by the second target puzzle, that generates an announcement assertion specifying that the second transaction is valid in response to presence of an announcement specifying the first puzzle hash; and
        removing the third blockchain object from the set of blockchain objects; and
    validating the second transaction in response to detection of the first announcement specifying the first puzzle hash according to the announcement assertion.

2. The method of claim 1, further comprising:
    accessing a first block of the blockchain, the first block comprising a first object record specifying the set of blockchain objects comprising the first blockchain object and the third blockchain object; and
    in response to executing the first target puzzle and the second target puzzle, generating a second block of the blockchain comprising a second object record specifying the set of blockchain objects:
        comprising the second blockchain object; and
        excluding the first blockchain object and the third blockchain object.

3. The method of claim 2, further comprising generating a time assertion in response to executing the first target puzzle, the time assertion specifying the first transaction is valid in response to a first timestamp, corresponding to the first block, exceeding a predefined timestamp.

4. The method of claim 1:
    wherein accessing the first transaction to execute the first target blockchain object comprises accessing the first transaction further defining a solution representing a set of arguments associated with the first target puzzle; and
    further comprising generating an output in response to executing the first target puzzle based on the solution.

5. The method of claim 4, wherein generating the second blockchain object comprises generating the second blockchain object in the set of blockchain objects in response to:
    detecting equivalence between the first target object identifier and the first object identifier;
    detecting equivalence between the first target puzzle hash and the first puzzle hash; and
    evaluating the output as true.

6. The method of claim 1:
    wherein accessing the first transaction to execute the first target blockchain object comprises accessing the first transaction further defining a solution representing a set of arguments associated with the first target puzzle; and
    further comprising, in response to executing the first target puzzle based on the solution, generating an object generation condition specifying the second object identifier and the second puzzle hash.

7. The method of claim 1:
    further comprising, generating a signature inclusion assertion in response to executing the first target puzzle, the signature inclusion assertion specifying the first transaction is valid in response to the first transaction defining a signature associated with a first public key;
    wherein accessing the first transaction to execute the first target blockchain object comprises accessing the first transaction further defining a first signature associated with the first public key; and
    wherein generating the second blockchain object in the set of blockchain objects comprises generating the second blockchain object in the set of blockchain objects in response to:
        detecting equivalence between the first target object identifier and the first object identifier;
        detecting equivalence between the first target puzzle hash and the first puzzle hash; and
        detecting the first transaction defining the first signature associated with the first public key.

8. The method of claim 1, further comprising, in response to detecting equivalence between the first target object identifier and the first object identifier, and in response to detecting equivalence between the first target puzzle hash and the first puzzle hash:
   generating a set of assertions in response to executing the first target puzzle; and
   validating the first transaction in response to evaluating each assertion in the set of assertions as true.

9. The method of claim 1, wherein:
identifying the first blockchain object comprises identifying the first blockchain object further defining a first value representing a first amount of an asset; and
generating the second blockchain object defining the second object identifier based on the first object identifier comprises generating the second blockchain object defining the second object identifier based on a cryptographic hash of:
   the first object identifier;
   the second puzzle hash; and
   a second value representing a second amount of the asset.

10. The method of claim 1:
wherein identifying the first blockchain object comprises identifying the first blockchain object further defining a first value representing a first amount of an asset, the first value characterized by a sum of:
   a second value representing a second amount of the asset; and
   a third value representing a third amount of the asset;
wherein generating the second blockchain object comprises generating the second blockchain object further defining the second value; and
further comprising, in response to detecting equivalence between the first target object identifier and the first object identifier, and in response to detecting equivalence between the first target puzzle hash and the first puzzle hash, generating a fourth blockchain object defining the third value.

11. The method of claim 1:
wherein accessing the second transaction comprises accessing the second transaction defining a second target object identifier;
wherein identifying the third blockchain object comprises identifying the third blockchain object defining a third object identifier; and
wherein executing the second target puzzle comprises executing the second target puzzle in response to:
   detecting equivalence between the second target object identifier and third first object identifier; and
   detecting equivalence between the second target puzzle hash and the third puzzle hash.

12. The method of claim 1, further comprising:
accessing a first block of the blockchain, the first block comprising a first object record specifying the set of blockchain objects comprising:
   the first blockchain object; and
   the third blockchain object;
in response to detecting equivalence between the second target puzzle hash and the third puzzle hash, generating a fourth blockchain object in the set of blockchain objects, the second blockchain object defining a fourth puzzle hash representing a fourth puzzle based on the third puzzle; and
generating a second block of the blockchain comprising a second object record specifying the set of blockchain objects:
   comprising the second blockchain object and the fourth blockchain object; and
   excluding the first blockchain object and the third blockchain object.

13. A method for extending a blockchain in a distributed network, the method comprising, by a node in the distributed network, during a first time period:
accessing a transaction set comprising:
   a first transaction to execute a first target blockchain object, the first transaction defining:
      a first target object identifier; and
      a first target puzzle defining a first set of instructions; and
   a second transaction to execute a second target blockchain object, the second transaction defining:
      a second target object identifier; and
      a second target puzzle defining a second set of instructions;
generating a first target puzzle hash based on a cryptographic hash of the first set of instructions;
generating a second target puzzle hash based on a cryptographic hash of the second set of instructions;
identifying a first blockchain object in a set of blockchain objects, the first blockchain object defining:
   a first object identifier; and
   a first puzzle hash representing a first puzzle defining a third set of instructions;
identifying a second blockchain object in the set of blockchain objects, the second blockchain object defining:
   a second object identifier; and
   a second puzzle hash representing a second puzzle defining a fourth set of instructions;
in response to detecting equivalence between the first target object identifier and the first object identifier, and in response to detecting equivalence between the first target puzzle hash and the first puzzle hash, executing the first set of instructions, defined by the first target puzzle, that generates a first announcement specifying the first object identifier;
in response to detecting a match between the second target object identifier and the second object identifier, in response to detecting a match between the second target puzzle hash and the second puzzle hash, executing the second set of instructions, defined by the second target puzzle, that generates an announcement assertion specifying that the second transaction is valid in response to presence of an announcement specifying the first object identifier; and
in response to detection of the first announcement specifying the first object identifier:
   generating a third blockchain object, in the set of blockchain objects, based on the second blockchain object;
   removing the second blockchain object from the set of blockchain objects; and
   validating the transaction set according to the assertion.

14. The method of claim 13, further comprising, during a second time period preceding the first time period:
accessing a third transaction to execute the second target blockchain object, the third transaction defining:
   a third target object identifier; and
   a third target puzzle;
generating a third target puzzle hash based on the third target puzzle; and
in response to detecting equivalence between the third target object identifier and the second object identifier, in response to detecting equivalence between the third target puzzle hash and the second puzzle hash, and in response to detecting an absence of the first announcement specifying the first puzzle hash, aborting the third transaction.

15. The method of claim 13, further comprising, in response to detecting equivalence between the first target object identifier and the first object identifier, and in response to detecting equivalence between the first target puzzle hash and the first puzzle hash:
generating a fourth blockchain object in the set of blockchain objects, the fourth blockchain object defining:
a third object identifier based on the first object identifier;
a third puzzle hash representing a third puzzle based on the first puzzle; and
a third value, representing a third amount of an asset, equal to zero; and
removing the first blockchain object from the set of blockchain objects.

16. The method of claim 13:
further comprising, generating a signature inclusion assertion in response to executing the first target puzzle and the second target puzzle, the signature inclusion assertion specifying the transaction set is valid in response to the transaction set defining a signature associated with a first public key and a second public key;
wherein accessing the transaction set comprises accessing the transaction set further comprising a first signature associated with the first public key and the second public key; and
wherein generating the third blockchain object comprises generating the third blockchain object, in the set of blockchain objects, based on the second blockchain object in response to:
detecting equivalence between the second target object identifier and the second object identifier;
detecting equivalence between the second target puzzle hash and the second puzzle hash;
detecting the first announcement specifying the first object identifier; and
detecting the transaction set defining the first signature associated with the first public key and the second public key.

17. The method of claim 13, further comprising generating a set of conditions in response to executing the first target puzzle and the second target puzzle, the set of conditions comprising the announcement assertion specifying that the second transaction is valid in response to the set of conditions comprising an announcement specifying the first object identifier.

18. The method of claim 13, further comprising generating a block based on a proof-of-space, the block comprising an object record specifying the set of blockchain objects comprising the third blockchain object and excluding the second blockchain object.

19. A method for extending a blockchain in a distributed network, the method comprising, by a node in the distributed network:
accessing a first transaction to execute a first target blockchain object, the first transaction defining:
a first target object identifier; and
a first target puzzle defining a first set of instructions;
generating a first target puzzle hash based on a cryptographic hash of the first set of instructions;
identifying a first blockchain object in a set of blockchain objects, the first blockchain object defining:
a first object identifier; and
a first puzzle hash representing a first puzzle defining a second set of instructions;
in response to detecting equivalence between the first target object identifier and the first object identifier, and in response to detecting equivalence between the first target puzzle hash and the first puzzle hash:
executing the first set of instructions, defined by the first target puzzle, that generates a set of conditions excluding a first announcement specifying the first puzzle hash;
generating a second blockchain object in the set of blockchain objects, the second blockchain object defining:
a second object identifier based on the first object identifier; and
a second puzzle hash representing a second puzzle based on the first puzzle; and
removing the first blockchain object from the set of blockchain objects;
accessing a second transaction to execute a second target blockchain object, the second transaction defining a second target puzzle defining a third set of instructions;
generating a second target puzzle hash based on a cryptographic hash of the third set of instructions;
identifying a third blockchain object in the set of blockchain objects, the third blockchain object defining a third puzzle hash representing a third puzzle defining a fourth set of instructions;
in response to detecting equivalence between the second target puzzle hash and the third puzzle hash, executing the second target puzzle that generates an announcement assertion specifying that the second transaction is valid in response to presence of an announcement specifying the first puzzle hash;
identifying the second transaction as an invalid transaction according to the announcement assertion in response to detecting the set of conditions excluding the announcement specifying the first puzzle hash; and
generating a block of the blockchain comprising the first transaction and excluding the second transaction.

20. The method of claim 19, further comprising:
accessing a first block of the blockchain, the first block comprising a first object record specifying the set of blockchain objects comprising:
the first blockchain object; and
the third blockchain object;
in response to detecting equivalence between the second target puzzle hash and the third puzzle hash, generating a fourth blockchain object in the set of blockchain objects, the second blockchain object defining a fourth puzzle hash representing a fourth puzzle based on the third puzzle; and
in response to executing the first target puzzle and the second target puzzle, generating a second block of the blockchain comprising a second object record specifying the set of blockchain objects:
comprising the second blockchain object and the third blockchain object; and
excluding the first blockchain object.

* * * * *